US011618300B2

(12) United States Patent
Woodward et al.

(10) Patent No.: US 11,618,300 B2
(45) Date of Patent: Apr. 4, 2023

(54) ACTIVE AIR CURTAIN

(71) Applicant: NIO Technology (Anhui) Co., Ltd., Anhui (CN)

(72) Inventors: Adam T. Woodward, San Jose, CA (US); Ren Ren, San Jose, CA (US); Matthew S. Filipkowski, Pleasanton, CA (US); Yifan Li, San Jose, CA (US)

(73) Assignee: NIO Technology (Anhui) Co., Ltd., Heifei (CN)

(*) Notice: Subject to any disclaimer, the term of this patent is extended or adjusted under 35 U.S.C. 154(b) by 909 days.

(21) Appl. No.: 16/420,589

(22) Filed: May 23, 2019

(65) Prior Publication Data

US 2020/0369115 A1   Nov. 26, 2020

(51) Int. Cl.
    *B60H 1/00* (2006.01)

(52) U.S. Cl.
    CPC ..... *B60H 1/00692* (2013.01); *B60H 1/00871* (2013.01); *B60H 2001/00728* (2013.01)

(58) Field of Classification Search
    CPC ............ B60H 1/00692; B60H 1/00728; B60H 1/00871
    USPC ..................... 454/95, 96, 135, 137, 155, 156
    See application file for complete search history.

(56) References Cited

U.S. PATENT DOCUMENTS

| 9,388,996 B2 | 7/2016 | Ray et al. |
| 9,597,945 B2 | 3/2017 | Maranville et al. |
| 2008/0108291 A1* | 5/2008 | Biasiotto ............... B60H 1/3414 454/69 |
| 2009/0038774 A1* | 2/2009 | Ogiso ..................... B60H 1/245 62/239 |
| 2013/0149952 A1* | 6/2013 | Demerath ............. B60H 1/3421 454/155 |
| 2017/0120721 A1* | 5/2017 | Zhang ..................... B60H 1/345 |
| 2018/0281560 A1 | 10/2018 | Dearth et al. |

FOREIGN PATENT DOCUMENTS

| DE | 102007043180 | 3/2008 |
| KR | 20100088187 | 8/2010 |
| RU | 143153 | 7/2014 |
| WO | WO 2016/178872 | 11/2016 |
| WO | WO 2018/049159 | 3/2018 |

* cited by examiner

*Primary Examiner* — Avinash A Savani
*Assistant Examiner* — Dana K Tighe
(74) *Attorney, Agent, or Firm* — Sheridan Ross, PC

(57) ABSTRACT

Systems, methods, and apparatuses are described herein that provide a localized temperature solution to a local temperature issue. Sunloading on one side of a vehicle can create a localized heating issue for an occupant on the same side of the vehicle. An air curtain system on the driver's side of the vehicle can detect high sunloading and then direct airflow onto an interior surface of the vehicle such as a door and window. The airflow provides an ambient cooling solution between the occupant and the sun to mitigate the effects of high sunloading. The air curtain system can receive a further input to redirect airflow away from the interior surface and onto the occupant to provide a direct cooling solution to further mitigate the effects of high sunloading. Other features, including sensors and a control unit, for controlling the air curtain system are described herein.

7 Claims, 16 Drawing Sheets

ACTIVE AIR CURTAIN

FIELD

The present disclosure is generally directed to vehicle systems, and more particularly to vehicle cooling systems.

BACKGROUND

Heating, ventilation, and cooling (HVAC) systems have long been included in automobiles, whether as standard or optional equipment. Such systems typically comprise an HVAC module, which receives air, conditions the air as necessary (whether by heating or cooling, although in some instances no conditioning is needed or effected), mixes the air as necessary (e.g., mixes cooled air with fresh air or warm air with fresh air to achieve a desired air temperature), and blows the air through one or more ducts to one or more vents in the passenger cabin of the vehicle. HVAC modules thus selectively provide air, for example, to dashboard-mounted or dash-level vents, ceiling and sidewall mounted vents, floor-mounted or foot-level vents, and defrosting vents. Conventionally, automotive air vents may be manually adjusted to blow air in different horizontal directions by turning hinged vertical vanes toward the left or right. Furthermore, vents may provide directed air and/or ambient air where directed air is particularly noticeable by the occupant, and ambient air is not particularly noticeable by the occupant.

High sunloads, particularly during the summer months, present a localized heating issue for HVAC systems in automobiles. For instance, when driving an automobile, the sun may be positioned on one side of the vehicle, and therefore, imparts solar radiation on that side of the vehicle. Directed air on the dashboard, console, pillars, and overhead location of the automobile are not desirable because directed air cools only parts of an already-hot occupant. Ambient air is typically limited to the dashboard and does not mitigate sunloading on one side of the vehicle. In addition, ambient air vents are typically positioned below the beltline of the occupant, and thus, full coverage of the occupant is difficult or impossible.

SUMMARY

These and other shortcomings are addressed by the various aspects, embodiments, and configurations of the present disclosure. Embodiments of the present disclosure provide an air curtain system that can change configurations and provide different cooling solutions in response to high sunloading. As a result, the comfort of an occupant is improved and the effects of high sunloading, for example, on one side of a vehicle are mitigated.

Embodiments of the present disclosure can provide two sets of vanes that control airflow out of a housing to change between an ambient cooling solution, a direct cooling solution, and no cooling solution as needed or desired. When the two sets of vanes are closed, the air curtain system does not provide a cooling solution. However, in response to an input such as a light sensor detecting high sunloading, both sets of vanes can open allowing the airflow to exit onto an interior surface of the vehicle such as a door and window, a dashboard, a headliner, or a trim. The airflow induces the coanda effect, and the airflow adheres to the interior surface as it flows. Thus, a volume of cooled air is positioned between the occupant and the sun to mitigate the effects of sunloading. If a more intense cooling solution is desired, then one set of vanes can close to increase the velocity of the airflow, and a flap can extend to redirect the airflow away from the interior surface and onto the occupant to provide a direct cooling solution.

Embodiments of the present disclosure can provide a control unit that receives readings from sensors, processes the readings, and then causes the air curtain system to provide a cooling solution. The control unit can have instructions stored on a computer readable medium, and the instructions can include comparing a reading from a light sensor to a predetermined range of readings to determine if the air curtain should remain in a closed position or provide a particular cooling solution.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the diagrams are provided for example purposes only, and should not be read as limiting the scope of the disclosure. Many other configurations, including more or less than two sets of vanes, are fully contemplated and included in the scope of the disclosure.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles and in non-vehicle environments.

Figure 1:
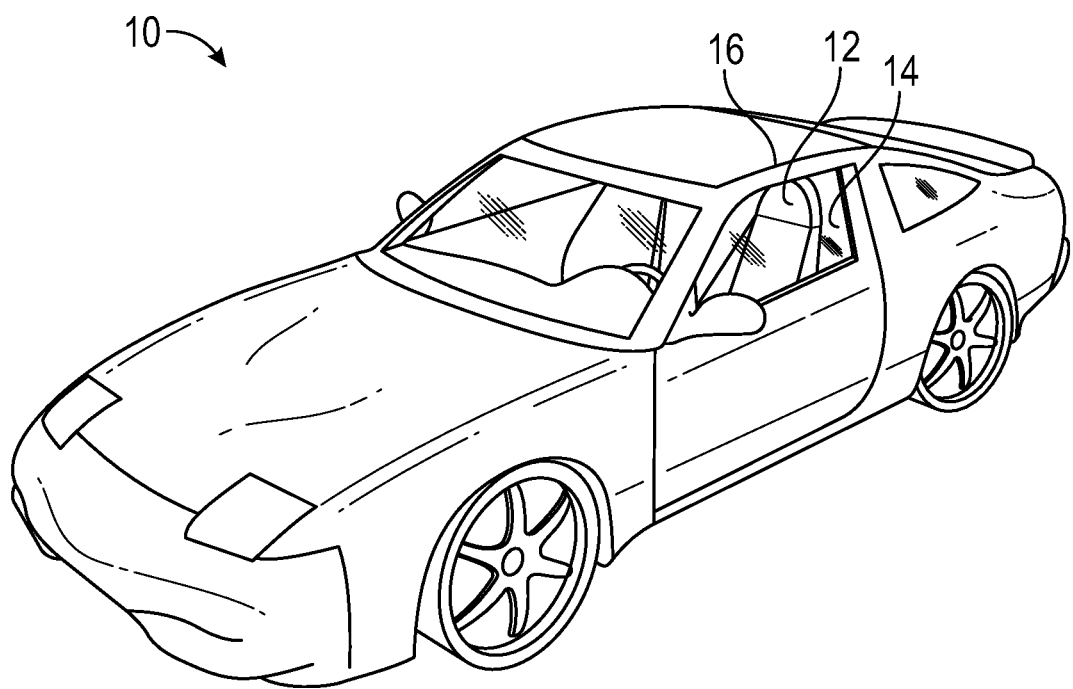
FIG. 1 is a perspective view of a vehicle in accordance with embodiments of the present disclosure.

FIG. 1 shows a perspective view of a vehicle 10 in accordance with embodiments of the present disclosure. The vehicle 10 has a seat 12 that receives an occupant, a door and window 14 positioned next to the seat 12, and a roof 16 positioned above the seat 12. In addition, the vehicle 10 may have a vehicle front, vehicle aft, a vehicle undercarriage, and a vehicle interior. The vehicle 10 may include a frame, one or more body panels mounted or affixed thereto, and a windshield. The vehicle 10 may include one or more interior components (e.g., components inside an interior space, or user space, of a vehicle 10, etc.), exterior components (e.g., components outside of the interior space, or user space, of a vehicle 10, etc.), drive systems, controls systems, structural components, etc.

The vehicle 10 may be, by way of example only, an electric vehicle or a gas-powered vehicle. Where the vehicle 10 is an electric vehicle, the vehicle 10 may comprise one or more electric motors powered by electricity from an on-board battery pack. The electric motors may, for example, be mounted near or adjacent an axis or axle of each wheel of the vehicle, and the battery pack may be mounted on the vehicle undercarriage. In such embodiments, the front compartment of the vehicle, referring to the space located under the vehicle hood, may be a storage or trunk space. Where the vehicle 10 is a gas-powered vehicle, the vehicle 10 may comprise a gas-powered engine and associated components in the front compartment (under the vehicle hood), which engine may be configured to drive either or both of the front wheels and the rear wheels. In some embodiments where the vehicle 10 is gas-powered, the gas-powered engine and associated components may be located in a rear compartment of the vehicle 10, leaving the front compartment available for storage or trunk space or for other uses. In some embodiments, the vehicle 10 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 10 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2:
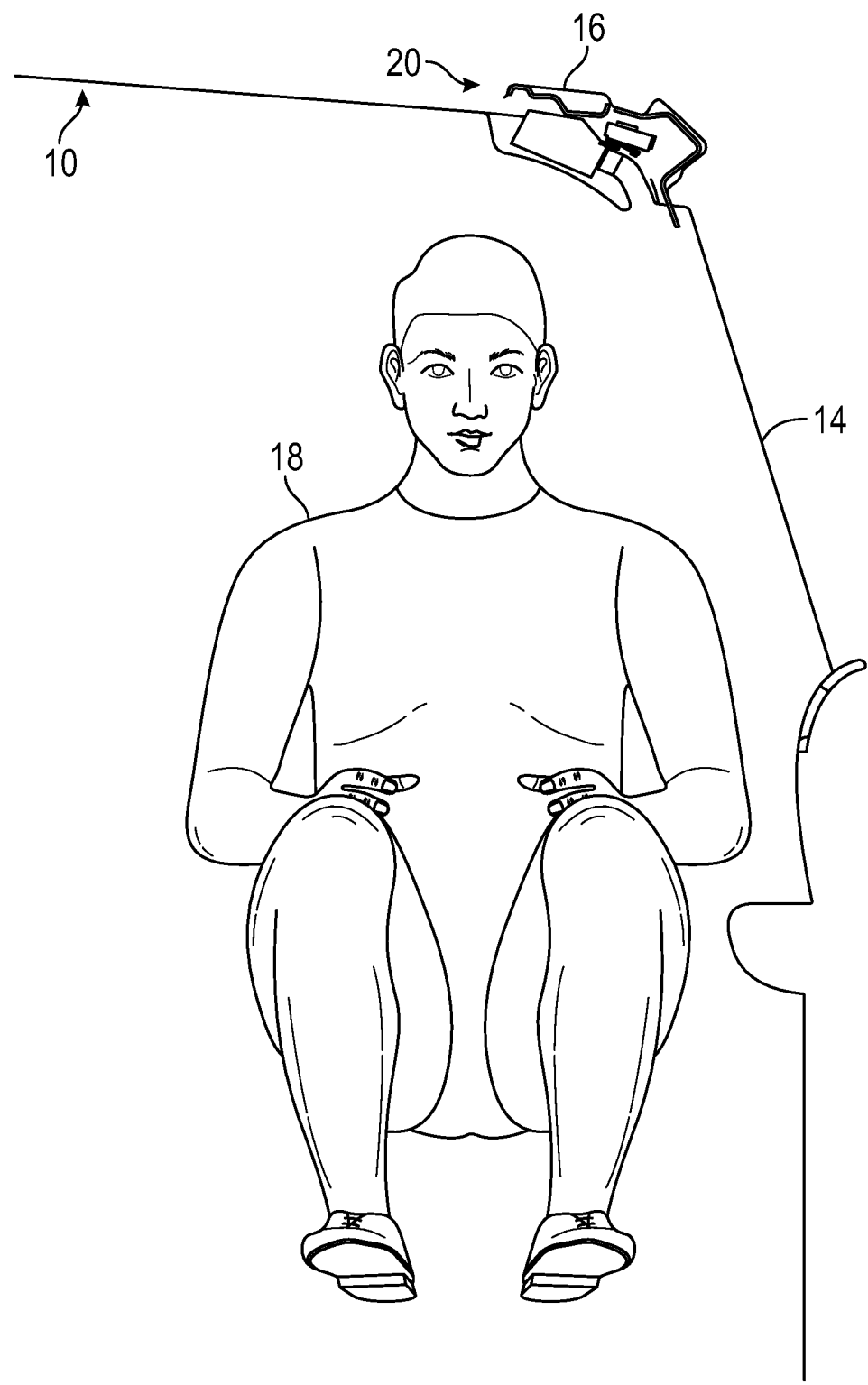
FIG. 2 is a cross-sectional elevation view of the vehicle in FIG. 1 and an air curtain system in accordance with embodiments of the present disclosure.

Referring now to FIG. 2, a cross-sectional elevation view of the vehicle in FIG. 1 and an air curtain system is provided in accordance with embodiments of the present disclosure. An occupant 18 is sitting in a seat (not shown) and positioned next to a door and window 14 and beneath a roof 16. In some driving conditions, a light source such as the sun can impose a high sunload on one side of the vehicle 10. For instance, driving on an interstate with the sun located on the driver's side of the vehicle 10 can impose a high sunload on the driver's side of the vehicle that is felt by occupants on the driver's side of the vehicle 10 but not felt by occupants on the other side of the vehicle 10. In this embodiment, an air curtain system 20 is positioned in the headliner above the occupant 18 can provide an ambient or direct cooling solution to mitigate the effect of high sunloading. It will be appreciated that embodiments of the present disclosure can apply to heated airflow, non-heated airflow, mixed airflow, etc. In addition, while the air curtain system 20 is depicted as positioned in the headliner and oriented substantially parallel to a ground surface, it will be appreciated that the air curtain system 20 can be located in a variety of positions and orientations (vertically on the A pillar, B pillar, etc.) within or even outside of the vehicle 10.

Figure 3:
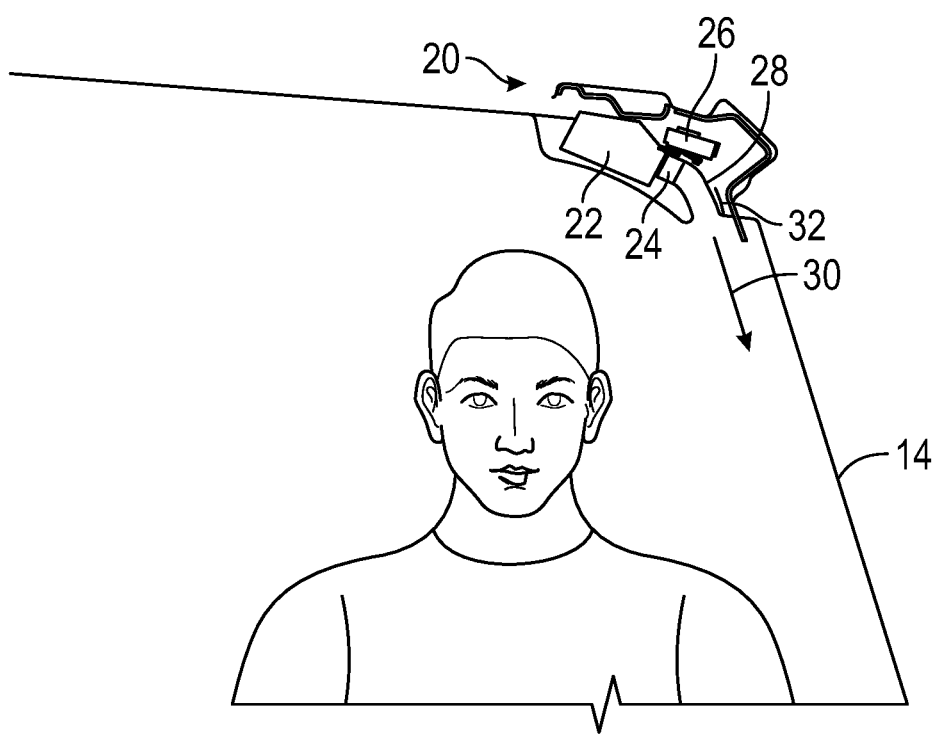
FIG. 3 is another cross-sectional elevation view of the vehicle in FIG. 1 and an air curtain system in accordance with embodiments of the present disclosure.

Referring now to FIG. 3, a more detailed cross-sectional elevation view of the vehicle in FIG. 1 and an air curtain system 20 is provided in accordance with embodiments of the present disclosure. A housing 22 is operably connected to the heating, ventilation, and air conditioning (HVAC) system of the vehicle, and the housing 22 receives an airflow from the HVAC system. In some embodiments, operably connected can mean functionally connected such as physically or electrically connected, with or without intervening components. In other embodiments, the housing 22 may include one or more components that are typically found in an HVAC system. For instance, the housing 22 may include an air blower, a heating element, a portion of a cooling loop such as an evaporator, etc.

The housing 22 directs the airflow out of an opening and past vanes 24. The vanes 24 can rotate between an open position to allow the airflow to pass through the opening unimpeded and a closed position to obstruct the airflow from passing through the opening. As described in further detail below, a different cover over the opening such as a barrel may be used to permit and obstruct the airflow. An actuator 26 is operably connected to the vanes 24 to move the vanes between the open and closed positions.

Next, a conduit 28 directs the airflow after the airflow has passed the vanes 24. In this embodiment, the conduit is curved and changes the direction of the airflow from an initial direction at the vanes 24 to a final direction 30 at the opposing end of the conduit 28. The airflow exits the conduit 28 in a direction 30 that forms and angle with an interior surface of the vehicle, which in this embodiment is a door and window. The angle can be between approximately 0 and 30 degrees in various embodiments, and the term "approximately" can mean a less than 10% relative difference. The angle and the relationship between the direction 30 of the airflow and the interior surface 14 induce a coanda effect where the airflow adheres to the interior surface to form a localized cooling solution between the occupant and a light source. The coanda effect is a fluid dynamics phenomenon that causes an airflow to adhere to or follow along a surface as a cogent airflow. An airflow entrains ambient air, and when a surface is placed near the airflow, the entrainment of air between the airflow and the surface causes a reduction in pressure. The ambient air pressure is greater than this reduced pressure, and a net force acts on the airflow, pushing the airflow against the surface. The adhered airflow can travel along the surface even as the surface curves. With cooled air traveling along an interior surface, an ambient cooling solution is provided and the heating effect of a sunloading on one side of the vehicle is mitigated to the comfort of the occupant.

Also shown in FIG. 3 is a flap 32, which is movable between a retracted position (as shown) and an extended position. When the flap 32 is retracted, the flap 32 permits the airflow to exit the conduit 28 unobstructed and an ambient cooling solution is provided. When the flap 32 is extended, the flap 32 redirects the airflow in a direction away from the interior surface of the door and window 14 and onto the occupant for a direct cooling solution. An actuator can move the flap 32 between positions, and the actuator can move the flap 32 in response to a signal from a control unit. It will be appreciated that manual movement of the flap 32 to the extended position can serve as an input to a control unit to then close one set of vanes to increase the velocity of the airflow.

Figure 4:
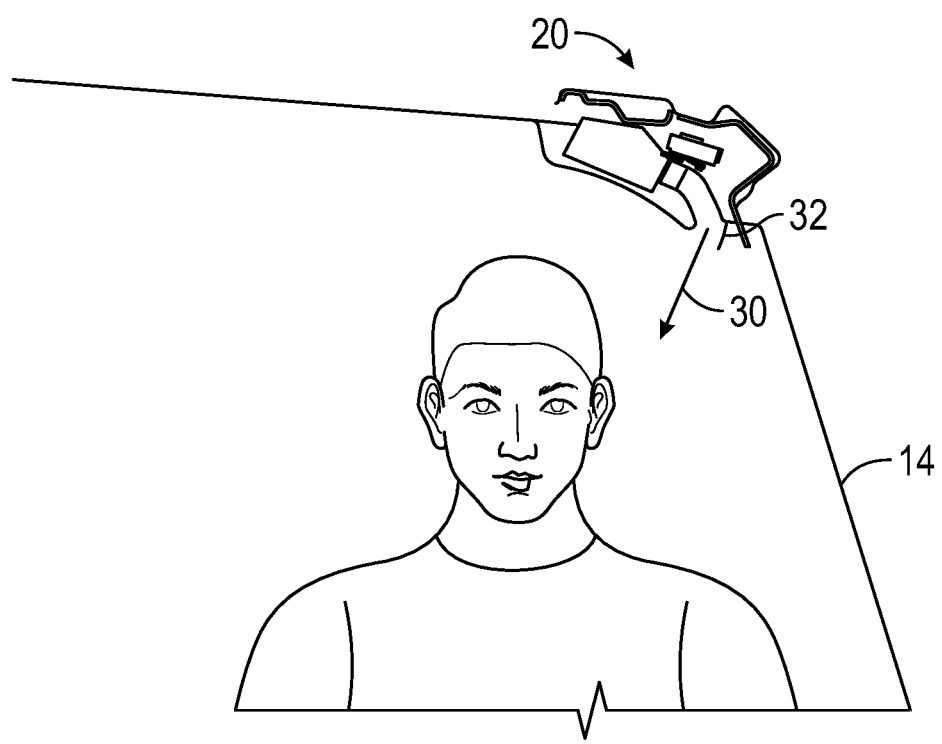
FIG. 4 is another cross-sectional elevation view of the vehicle in FIG. 1 and an air curtain system in accordance with embodiments of the present disclosure.

Now referring to FIG. 4, a detailed cross-sectional elevation view of the vehicle in FIG. 1 and an air curtain system 20 is provided in accordance with embodiments of the present disclosure. Here, the flap 32 is in the extended position to redirect the airflow away from the interior surface of the door and window 14 and onto the occupant for a direct cooling solution. It will be appreciated that a width dimension of the flap 32 can extend across the width dimension of the first opening or the width dimension of the first and second openings in some embodiments.

Figure 5A:
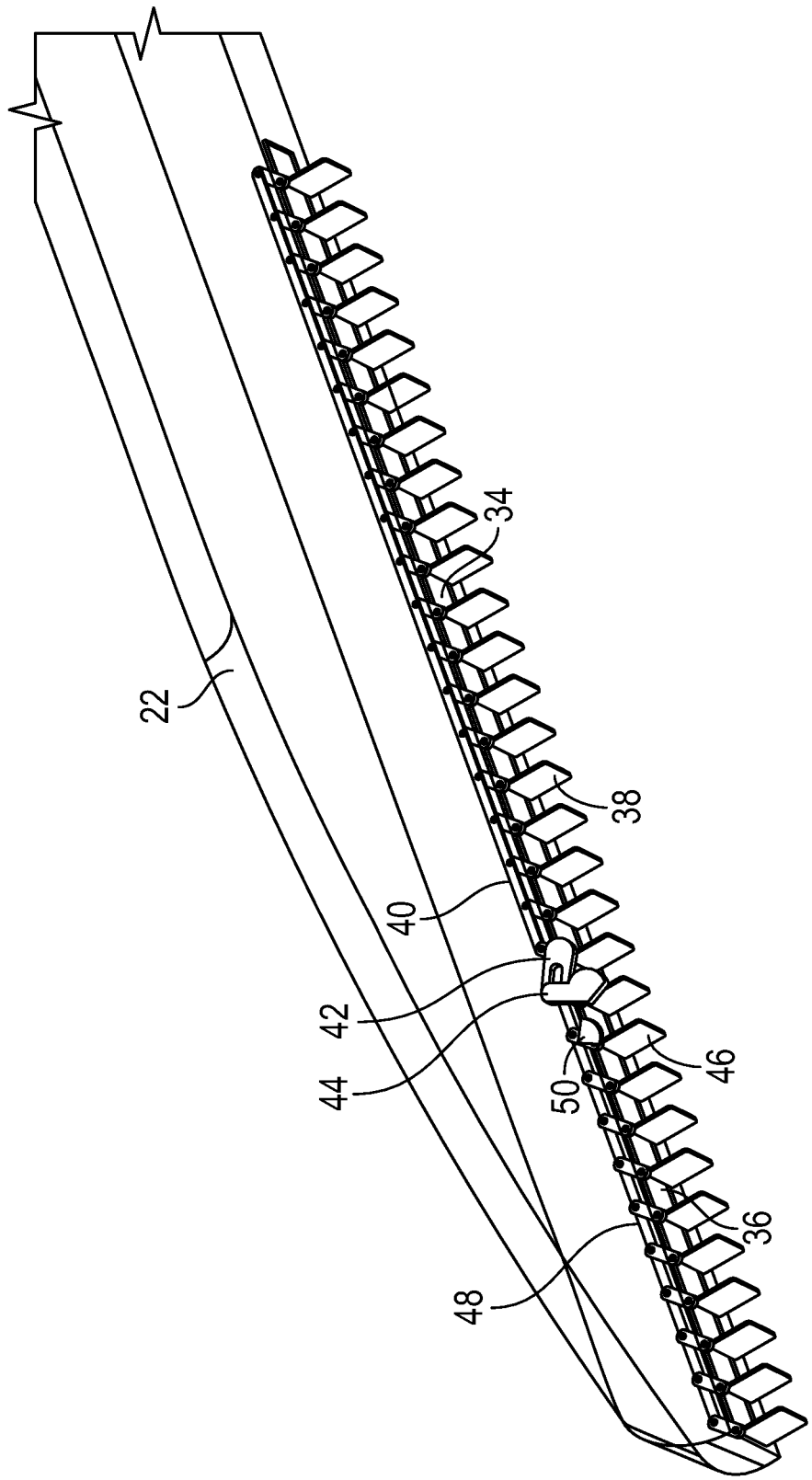
FIG. 5A is a perspective view of an air curtain system with vanes in a first configuration in accordance with embodiments of the present disclosure.
Figure 5B:
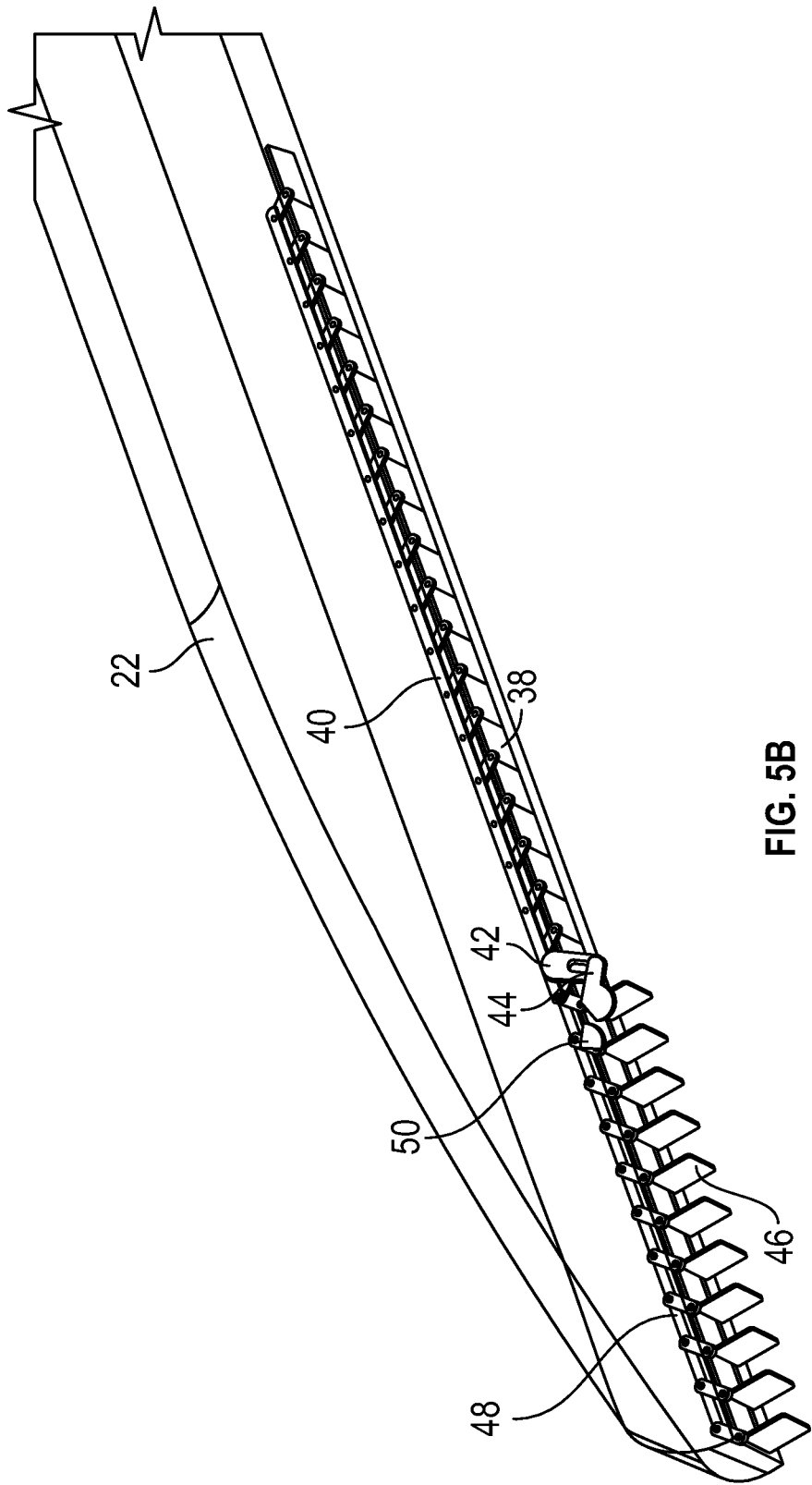
FIG. 5B is a perspective view of an air curtain system with vanes in a second configuration in accordance with embodiments of the present disclosure.

Now referring to FIGS. 5A and 5B, perspective views of an air curtain system with vanes in first and second configurations are provided in accordance with embodiments of the present disclosure. The vanes are in a first configuration in FIG. 5A for ambient cooling and a second configuration in FIG. 5B for direct cooling. The housing 22 has a first opening 34 and a second opening 36. In this embodiment, the openings 34, 36 combine to form a continuous opening having a height and a width with an aspect ratio of at least 1:5. However, it will be appreciated that the openings 34, 36 can be separate in some embodiments with different sizes and shapes. Further, in some embodiments, the area of the first opening 34 is equal to or greater than the area of the second opening 36.

Next, a first set of vanes 38 is positioned over the first opening 34. The first set of vanes 38 is rotatable between an open position as depicted in FIG. 5A and a closed position as depicted in FIG. 5B. A portion of each vane 38 is connected to a first link 40 so that the vanes 38 move and rotate together in unison. A first arm 42 is connected to at least one of a first vane 38 or the first link 40, and the first arm 42 is operably connected to an actuator arm 44. Thus, an actuator and actuator arm 44 can control the first arm, 42, the first link 40, and the position of the first vanes 38. As shown, there are a plurality of first vanes 38 that are each rotatable about an axis that is substantially parallel to an axis that the actuator arm 44 rotates about. In some embodiments, these axes are further parallel to a shaft of the actuator.

Similarly, a second set of vanes 46 is positioned over the second opening 36 and is rotatable between an open position as depicted in FIGS. 5A and 5B and a closed position (not shown). A second link 48 is connected to a portion of each vane 46 and a second arm 50 is connected to at least one of a second vane 46 or the second link 48. The second arm 50 is operably connected to the actuator arm 44. It will be appreciated that while the first vanes 38 are positioned in an aft direction, and the second vanes 46 are positioned in a front direction of the vehicle, the positions of the vanes 38, 46 may be reversed.

It will be appreciated that the vanes can be thin or substantially flat in a first dimension, and substantially square in a second dimension perpendicular to the first dimension. In addition, the vanes can be formed of plastic, such as polyethylene terephthalate or high-density polyethylene, glass, carbon-filled nylons, polybutylene terephthalate, etc. In some embodiments, the vanes may be formed of carbon fiber laminate or one or more other composite materials. In still other embodiments, the vanes may be formed of metal, such as an aluminum alloy or steel.

Figure 6A:
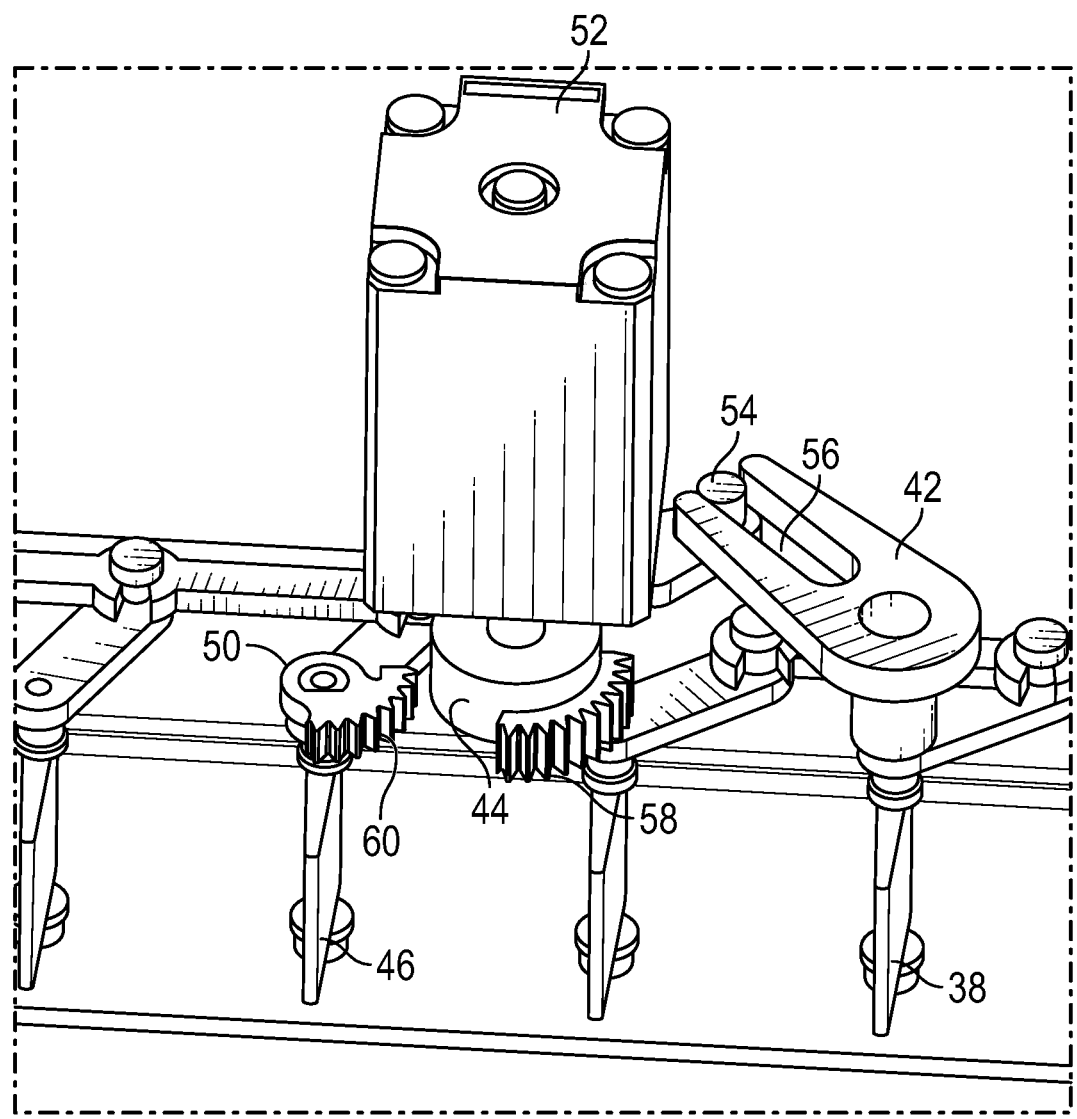
FIG. 6A is a perspective view of an air curtain system with vanes in a first configuration in accordance with embodiments of the present disclosure.
Figure 6B:
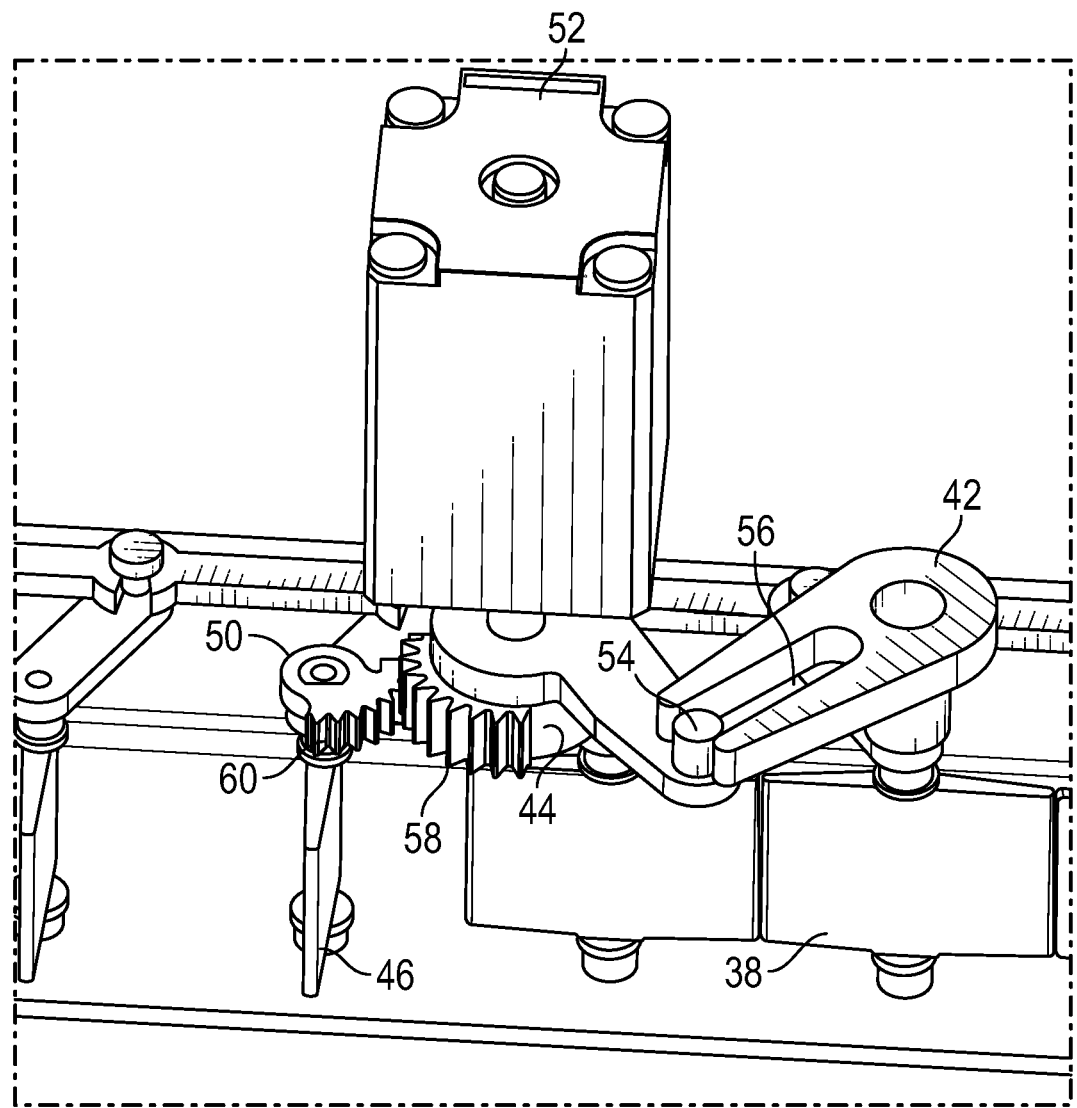
FIG. 6B is a perspective view of an air curtain system with vanes in a second configuration in accordance with embodiments of the present disclosure.
Figure 6C:
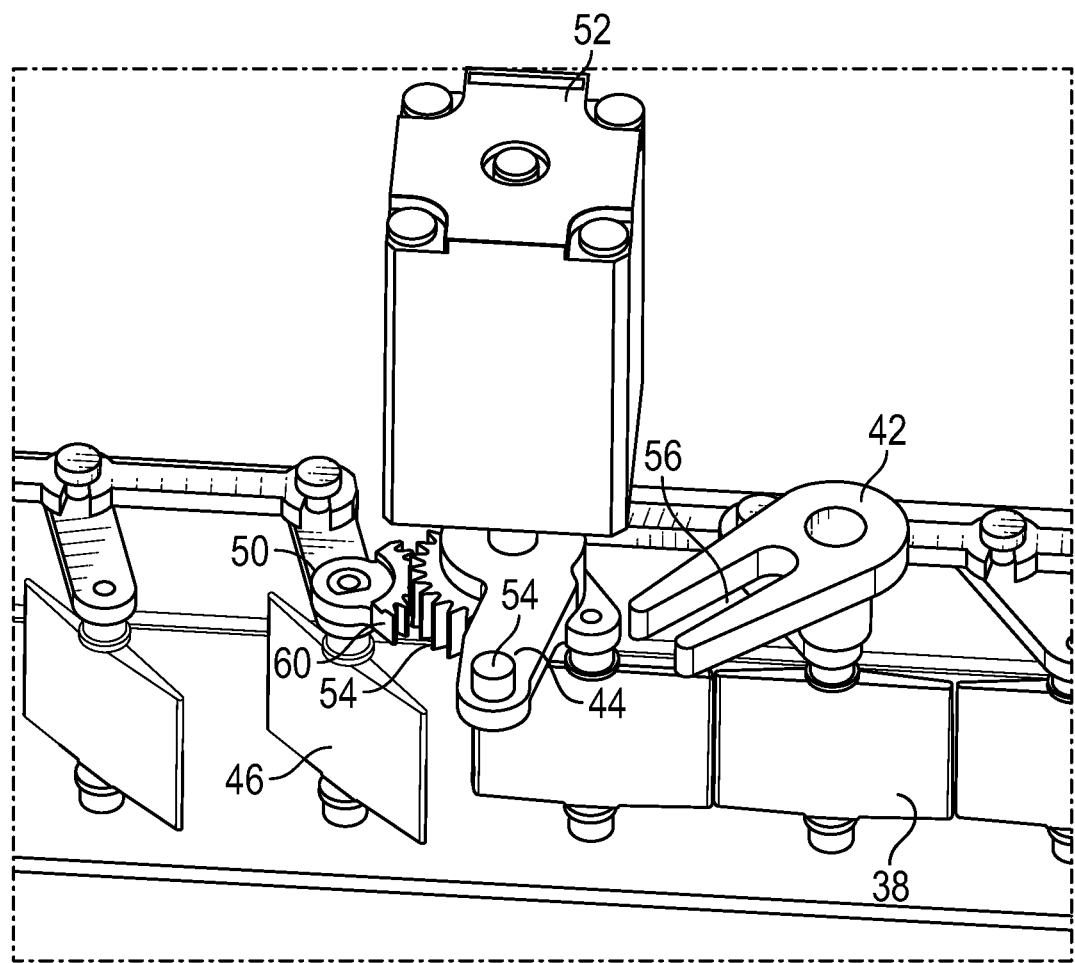
FIG. 6C is a perspective view of an air curtain system with vanes in a third configuration in accordance with embodiments of the present disclosure.

Referring now to FIGS. 6A, 6B, 6C, perspective views of an air curtain system with an actuator shaft in a first position, a second position, and between the second position and a third position, respectively, are provided in accordance with embodiments of the present disclosure. The actuator 52 can be an electric motor that rotates a shaft about an axis, and as shown, the actuator arm 44 is connected to the shaft and is movable between different positions. The first arm 42 has a slot 56, and a pin 54 of the actuator arm 44 is selectively positioned in the slot 56 to provide the operable connection between the actuator 52 and the first vanes 38. Similarly, a gear 58 on the actuator arm 44 is selectively connected to a gear 60 of the second arm 50 to provide the operable connection between the actuator 52 and the second vanes 46. These exemplary connections can be reversed in some embodiments or provided in any combination. For instance, in some embodiments, only gears provide the operable connection between the actuator 52 and the first vanes 38 and the operable connection between the actuator 52 and the second vanes 46.

Referring to FIG. 6A, the first and second vanes 38, 46 are in a first configuration where both vanes 38, 46 are in an open position, and the actuator arm 44 is in first position. With both sets of vanes 38, 46 open, and an ambient cooling solution is provided to mitigate the effects of high sunloading.

Referring to FIG. 6B, the actuator arm 44 has rotated clockwise 90 degrees about the axis of the actuator shaft to a second position. As a result, the pin 54 on the actuator arm 44 has moved in and out of the slot 56 of the first arm 42 to rotate the first arm 42 by 90 degrees. Thus, the first vanes 38 have rotated by 90 degrees to close the first opening. As the actuator arm 44 rotates between the first position and the second position, the gears 58, 60 do not engage, and the second arm 50 remains idle. The resulting airflow exits the second opening at a higher velocity and provides a direct cooling solution to an occupant.

Referring to FIG. 6C, the actuator arm 44 has rotated from a second position toward a third position, which is a further 90 degrees clockwise about the axis of the actuator shaft. The pin 54 and the slot 56 do not engage as the actuator arm 44 rotates from the second position to the third position, and therefore, the first arm 42 remains idle as the actuator arm 44 rotates. The gears 58, 60 engage as the actuator arm 44 rotates from the second position to the third position, the second arm 50 rotates 90 degrees, and the second vanes 46 rotate 90 degrees to close the second opening. The actuator and actuator arm 44 can rotate in the reverse direction to cycle through the positions and cooling solutions.

In some embodiments, the actuator may be a DC motor such as a 12-volt motor. The size and other characteristics of the motor may be selected, for example, based on the length of the shaft, the ease of rotation of the shaft, and the parameters of the electrical system of the vehicle in which the motor will be installed. In some embodiments, a single actuator may be (permanently or detachably) coupled to sets of vanes. It will be appreciated that manual, rather than automatic, controls may be desirable to reduce the complexity of a vehicle (e.g., by reducing the number of electrical components within the vehicle), and/or to avoid the expense of adding an actuator.

Figure 7:
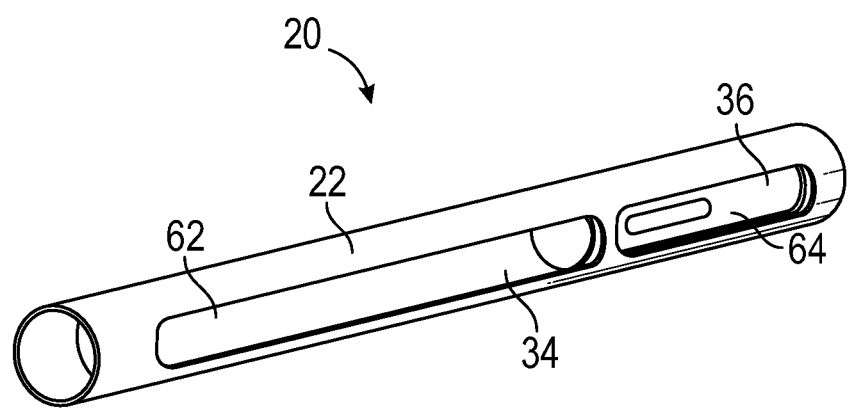
FIG. 7 is a perspective view of another air curtain system in accordance with embodiments of the present disclosure.

Referring now to FIG. 7, a further embodiment of the air curtain system 20 is provided. A housing 22 directs airflow out of first and second openings 34, 36, and first and second barrels 62, 64 can selectively cover the respective openings. As depicted, the barrels 62, 64 are in an open position. In this configuration, airflow can be directed onto an interior surface to induce the coanda effect, and the airflow adheres to the surface to cool a localized area and provide an ambient cooling solution in response to high sunloading. If a user decides that direct cooling is more appropriate, the user can provide an input into a system to rotate the first barrel 62 to a closed position so that the airflow exits the second barrel 64 at a higher velocity. Further, a flap may redirect the airflow away from the interior surface and onto the occupant to provide a direct cooling solution. Alternatively, the second barrel 64 can partially rotate without fully closing to direct the airflow onto the occupant. In this embodiment, the second opening can have a different height dimension than the first opening, or stated differently, the second opening could extend around a greater portion of the perimeter of the housing 22. As a result, the second barrel 64 can redirect the airflow from the interior surface to the occupant.

Figure 8A:
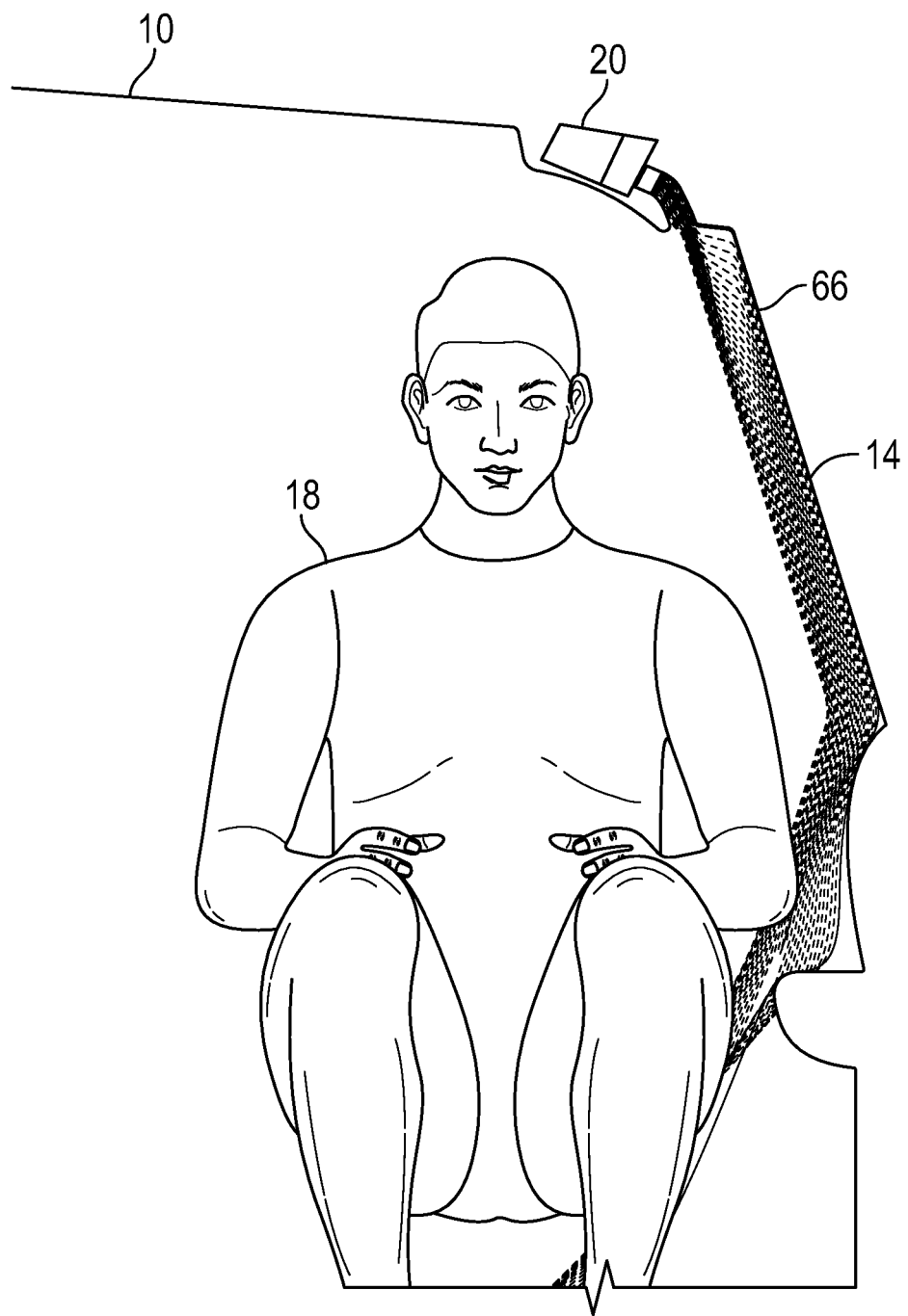
FIG. 8A is a cross-sectional elevation view of a vehicle and an air curtain system with vanes in a first configuration in accordance with embodiments of the present disclosure.
Figure 8B:
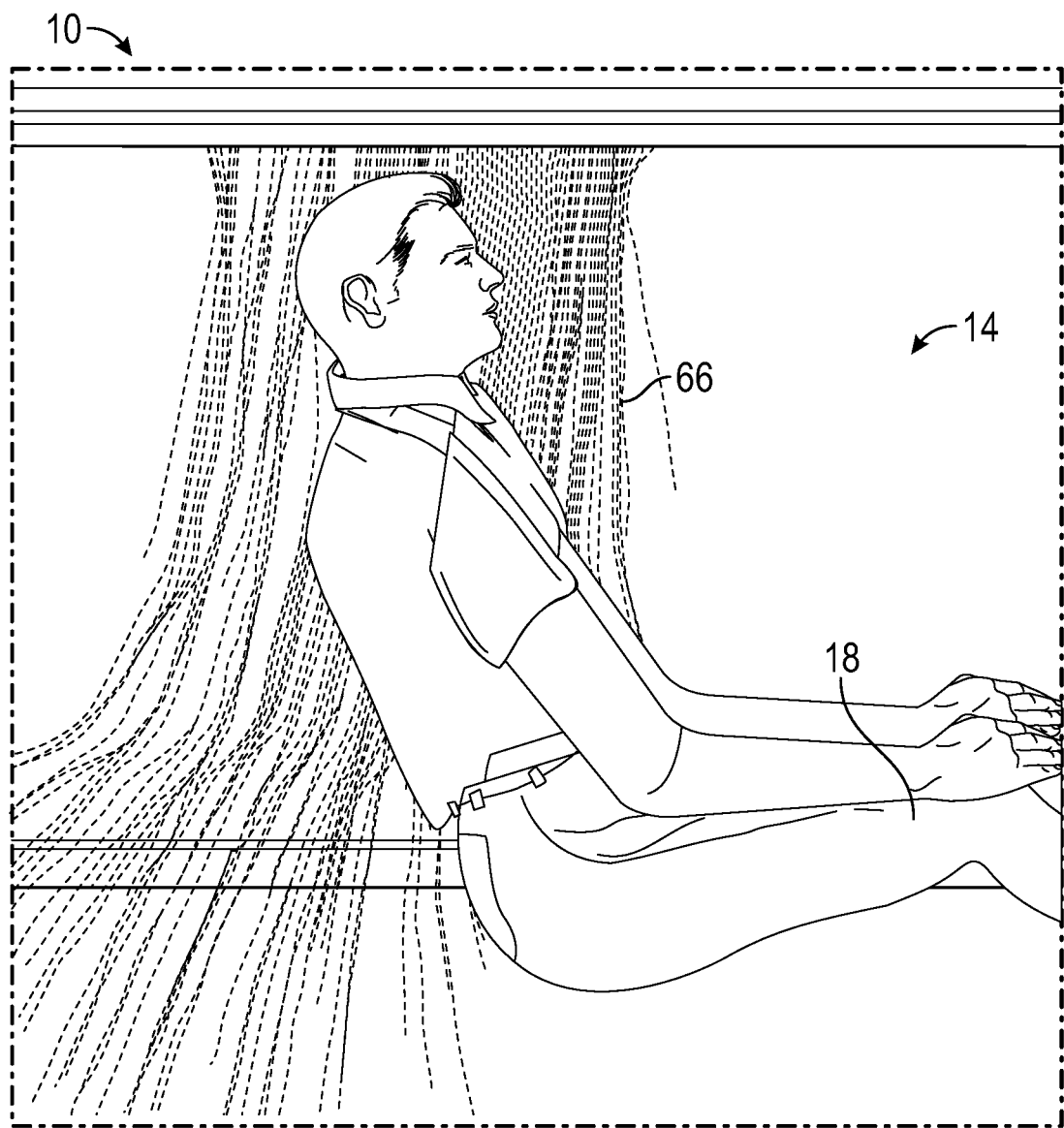
FIG. 8B is a side elevation view of the vehicle and the air curtain system in FIG. 8A in accordance with embodiments of the present disclosure.

Referring now to FIGS. 8A and 8B, views of a vehicle 10 and an air curtain system 20 with vanes in a first configuration and are provided in accordance with embodiments of the present disclosure. As shown, the first and second vanes are in an open position so that the airflow 66 exits through first and second openings in the housing of the air curtain system to provide an ambient cooling solution to an occupant. The airflow exits the conduit at an average velocity of approximately 2 m/s. The airflow is directed to an interior surface of the vehicle in induce the coanda effect, and the airflow adheres to the interior surface. This adhered airflow, which can be cooled air, forms a barrier against sunloading from the driver's side of the vehicle.

Figure 9A:
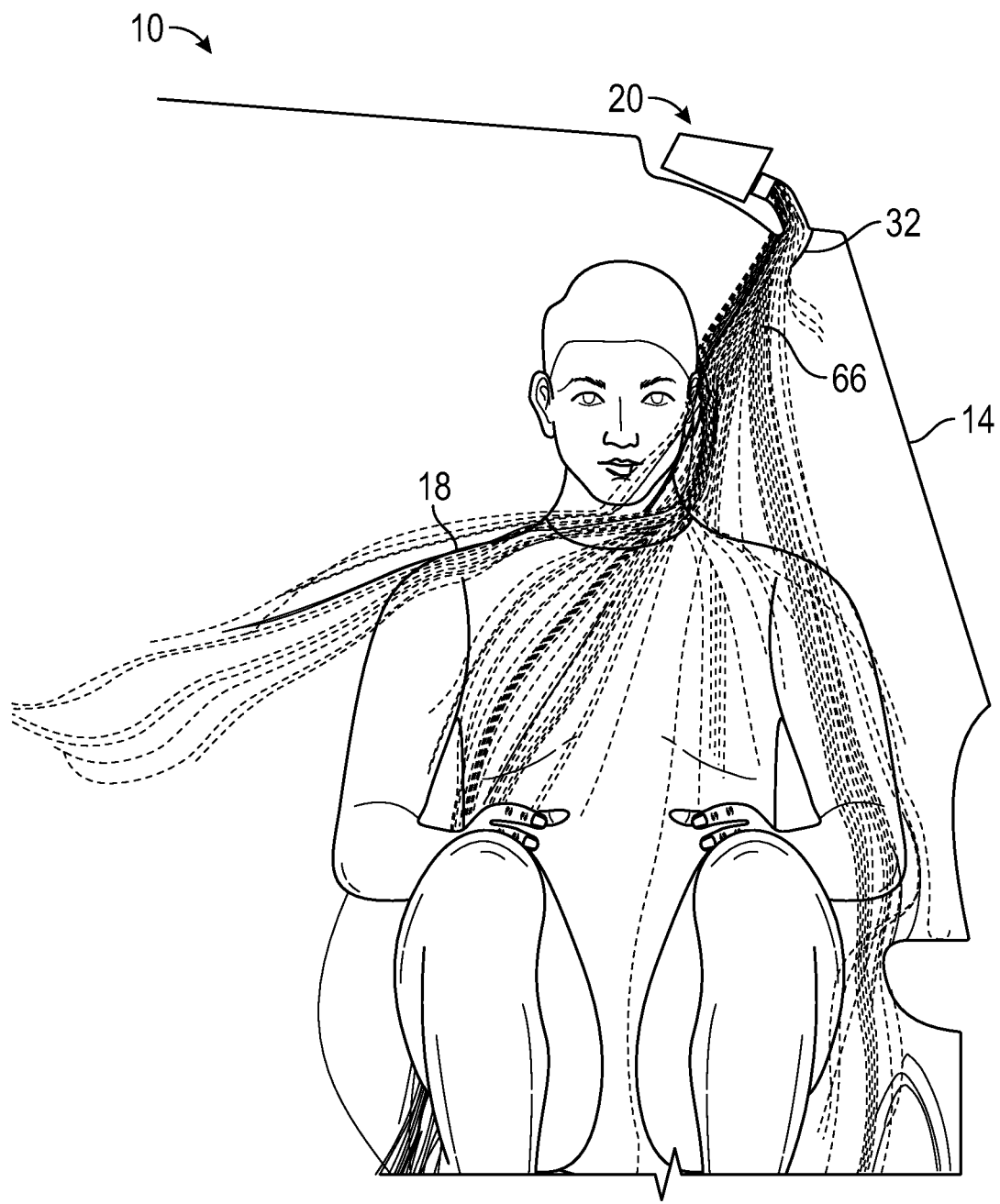
FIG. 9A is a cross-sectional elevation view of a vehicle and an air curtain system with vanes in a second configuration in accordance with embodiments of the present disclosure.
Figure 9B:
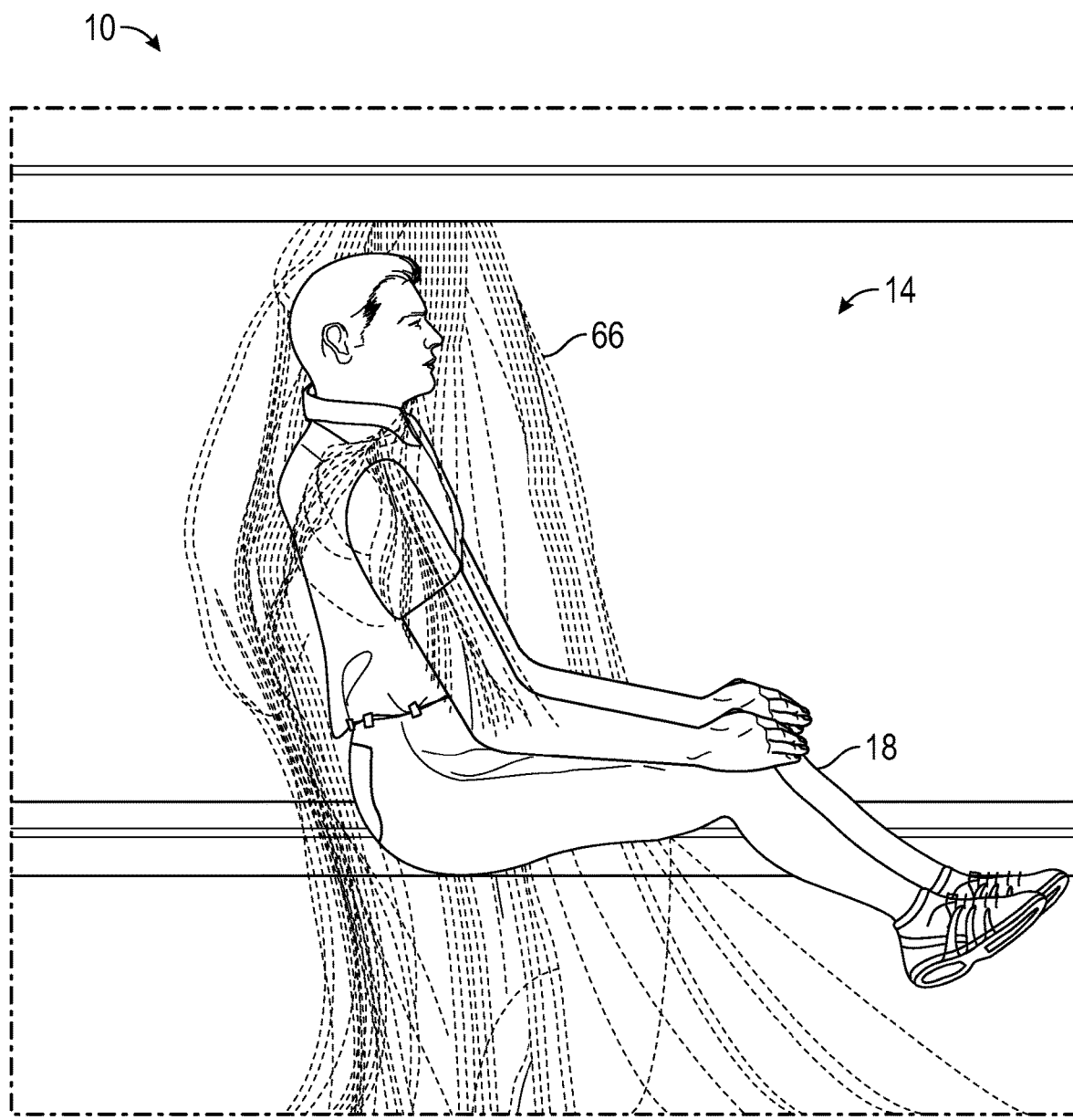
FIG. 9B is a side elevation view of the vehicle and the air curtain system in FIG. 9A in accordance with embodiments of the present disclosure.

Referring now to FIGS. 9A and 9B, views of a vehicle 10 and an air curtain system 20 with vanes in a second configuration and are provided in accordance with embodiments of the present disclosure. As shown, the first vanes are in a closed position, and the second vanes are in the open position. Furthermore, a flap 32 has been extended to redirect the airflow 66 away from the interior surface and onto the occupant to provide a direct cooling solution to the occupant. The airflow exits the conduit at an average velocity of approximately 5 m/s.

Figure 10:
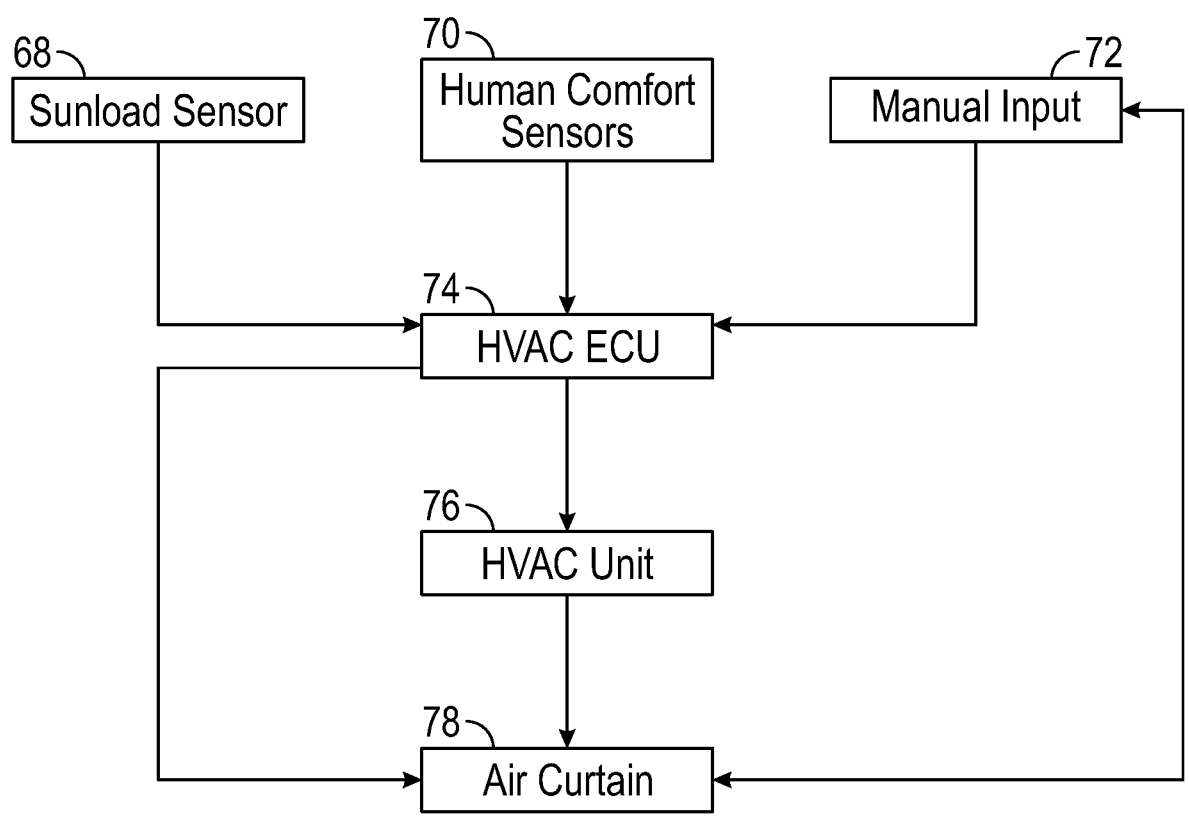
FIG. 10 is a view of a schematic layout of components of an air curtain system in accordance with embodiments of the present disclosure.

Referring now to FIG. 10, a schematic view of components of an air curtain system is provided in accordance with embodiments of the present disclosure. A sunload or light sensor 68 can detect a position and/or position of a light source or light sources as described herein. The sunload sensor 68 can be positioned on the front dashboard of a vehicle in some embodiments. Also shown are human comfort sensors 70 that detect characteristics of the ambient environment that are relevant to human comfort. These sensors 70 can include temperature sensors such as a thermometer, an infrared sensor, etc. that detect an ambient temperature of the vehicle interior and/or local temperatures within the vehicle interior such as a door and window where high sunloading may be apparent. Other exemplary sensors 70 can include a humidity sensors, acoustic sensors, etc. The readings from these sensors 68, 70 are sent to an HVAC electronic controller unit (ECU) or control unit 74.

The HVAC ECU 74 is in electronic communication with the HVAC system or unit 76 and the air curtain system 78 to cause these systems 76, 78 to perform certain actions. The HVAC ECU 74 receives readings from the sensors 68, 70 and then determines whether readings are within a predetermined range and/or have exceeded a predetermined threshold. If a reading is within a range or beyond a threshold, then the HVAC ECU 74 can cause the HVAC system 76 or air curtain system 78 to perform a single action. For example, if the sunload sensor 68 detects a light source at a position within a predetermined range of positions, then the HVAC ECU 74 can cause the air curtain 78 to move first and second sets of vanes from a closed position to an open position to provide localized cooling against high sunloading. Similarly, if a temperature sensor 70 detects an ambient temperature of 27 degrees Celsius within the vehicle and the predetermined threshold is 26 degrees Celsius, then the HVAC ECU 74 can cause the HVAC unit 76 to circulate the airflow with a cooler temperature to reduce the ambient temperature to less than 26 degrees Celsius.

In some embodiments, the HVAC ECU 74 can cause a certain action in response to a combination of readings from sensors 68, 70. For example, to cause the air curtain 78 to move vanes from a closed position to an open position and provide localized cooling, the HVAC ECU 74 may require both a light position reading within a predetermined range and a local temperature reading at a door and window above a threshold. Accordingly, it will be appreciated that the HVAC ECU 74 can require any one reading or combination of readings to cause the HVAC unit 76 to change the temperature or rate of the air flow and/or cause the air curtain 78 to take any action described herein. Lastly, a manual input 72 from the occupant in the form of a pressed button, an input on a touchscreen, a voice command, a physical gesture, etc. can cause the HVAC ECU 74 to cause the HVAC unit 76 and/or the air curtain 78 to perform an action. The manual input 72 can also include other physical inputs or human-machine interfaces such as slider knobs, joysticks, thumbwheels, etc.

Figure 11:
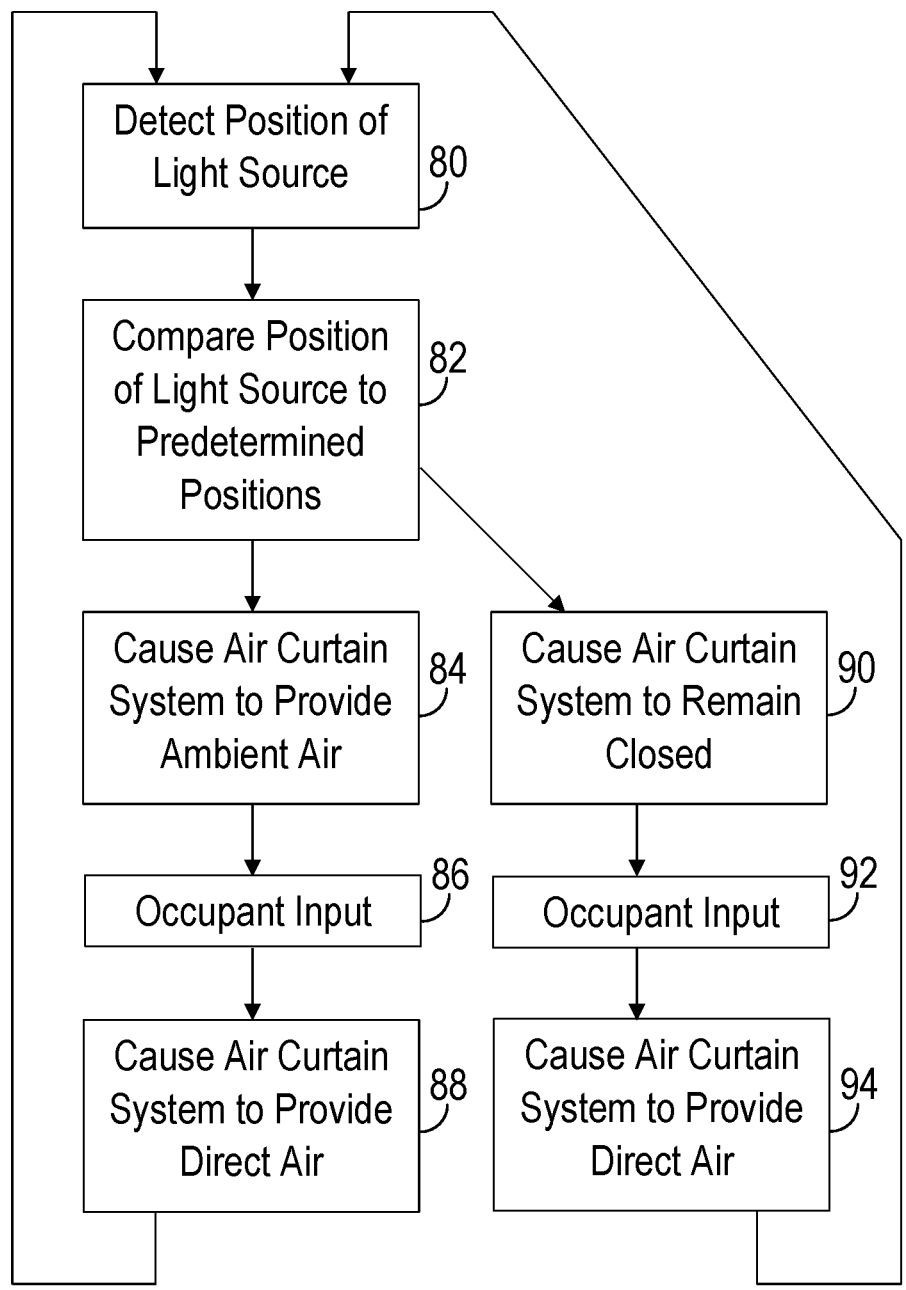
FIG. 11 is a view of a control logic for an air curtain system in accordance with embodiments of the present disclosure.

Referring now to FIG. 11, a view of a control logic for an air curtain system is provided in accordance with embodiments of the present disclosure. A control unit such as the HVAC ECU as described herein can execute instructions causing the performance of some or all of these actions, and alternatively, some or all of these actions can be performed by another (remotely located) computer system or user. In addition, these actions may be performed simultaneously or in a different order.

To begin, a light sensor may detect 80 a position of a light source. The light sensor can be positioned anywhere on the vehicle, for example, on the dashboard. Additional light sensors can be included for redundancy or to detect the position of a light source from different locations within the vehicle. The light sensor can detect a position of a light source in two and/or three dimensions. In two dimensions, the light sensor can detect a light source in a plane that is substantially parallel to a ground surface. 0 degrees can be set toward a front end of the vehicle, and 180 degrees can be set toward an aft end of the vehicle. In one example, the light sensor detects a light source at 270 degrees which corresponds to sunloading on the driver's side of the vehicle. In three dimensions, a height component can be included to determine, for example, the azimuth of the sun. Further, the light sensor may detect light sources with an intensity above a predetermined threshold so as to only detect significant sources of loading such as the sun. In some embodiments, the light sensor can detect an intensity of light for further actions in the control logic.

Next, a control unit can receive a light position from the light sensor, and the control unit compares 82 the position reading to a predetermined range of positions to determine if sunloading is an issue. If, for example, the light position is 280 degrees and the predetermined range of positions is 250 to 290 degrees, then the control unit determines that there is significant sunloading. Likewise, if the light position is 90 degrees and the predetermined range of positions is 250 to 290 degrees, then the control unit determines that there is not significant sunloading. It will be appreciated that there can be several predetermined ranges. For instance, a first range to determine if there is sunloading on the driver's side of the vehicle, a second range to determine if there is sunloading on the opposing side, etc. Similarly, ranges may overlap where a first range determines if a direct cooling solution is needed and a second range determines if an ambient cooling solution is needed.

If the light position falls within a predetermine range, then the control unit can cause 84 the air curtain system to provide an ambient cooling solution. In some embodiments, the ambient air is between an occupant and the light source to mitigate the effects of sunloading. Next, if the occupant determines that ambient air is not enough, then the occupant can provide a further input 86. This input can be to a physical button, a touch screen, etc. that is operably connected to the control unit. Further, this input can be a manual input to the air curtain to physically move components of the air curtain to provide direct cooling. As a result, the air curtain provides 88 a direct cooling onto the occupant for a more intense cooling solution to mitigate the effects of sunloading.

Alternatively, if the light position does not fall within a predetermine range, then the control unit can cause 90 the air curtain to remain closed. However, if for some reason the occupant determines that direct air is needed, then the occupant can provide an input 92 and cause the air curtain to provide direct air 94. Similarly, the occupant can provide an input to cause the air curtain to provide ambient air, if desired. Alternatively, the air curtain system can automatically switch from an ambient cooling solution to a direct cooling solution or from a closed position to a direct cooling solution in response to readings from a sensor. For example, a reading within further predetermined range and/or beyond further threshold can trigger the control unit to cause the air curtain system to provide a direct cooling solution to an occupant.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the air curtains positioned in a vehicle. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle, comprising: an interior surface; a housing that directs an airflow out of a first opening and a second opening, wherein an area of the first opening is equal to or greater than an area of the second opening; a first cover positioned over the first opening, the first cover moves between an open position to allow the airflow to exit the first opening and a closed position to obstruct the airflow from exiting the first opening; a second cover positioned over the second opening, the second cover moves between an open position to allow the airflow to exit the second opening and a closed position to obstruct the airflow from exiting the second opening; wherein, when the first and second covers are in the open positions, the airflow is directed to the interior surface such that a pressure between the airflow and the interior surface is less than an ambient pressure and the airflow adheres to the interior surface.

Aspects of the above vehicle can include: a flap positioned proximate to the second cover, and the flap moves between a retracted position where the flap allows the airflow to reach the interior surface and an extended position where the flap redirects the air flow away from the interior surface; the interior surface is a surface of a door and window; the housing is positioned above the door and window, and the airflow is directed in a downward direction to the surface of the door and window; the first opening and the second opening combine to form a continuous opening having a height and a width with an aspect ratio of at least 1:5; the airflow is directed to the interior surface in a direction that forms an angle with a portion of the interior surface, wherein the angle is between approximately 0 and 30 degrees; a conduit that directs the airflow from the first and second openings to the interior surface, wherein the conduit curves from a first end at the first and second openings to a second end.

Embodiments also include an air curtain system, comprising: a housing that directs an airflow out of a first opening and a second opening, wherein an area of the first opening is equal to or greater than an area of the second opening; a first set of vanes positioned over the first opening, the first set of vanes moves between an open position to allow the airflow to exit the first opening and a closed position to obstruct the airflow from exiting the first opening; a second set of vanes positioned over the second opening, the second set of vanes moves between an open position to allow the airflow to exit the second opening and a closed position to obstruct the airflow from exiting the second opening; an actuator having a rotatable shaft operably connected to the first and second sets of vanes, and the shaft is rotatable between a first position, a second position, and a third position, wherein the first and second sets of vanes are open in the first position, wherein the first set of vanes is closed and the second set of vanes is open in the second position, and wherein the first and second sets of vanes are closed in the third position.

Aspects of the above air curtain system can include: each vane of the first and second sets of vanes is rotatable about an axis that is parallel to an axis of the shaft of the actuator, wherein a first link is connected to each vane of the first set of vanes so that the vanes of the first set of vanes rotate together, and a second link is connected to each vane of the second set of vanes so that the vanes of the second set of vanes rotate together; an actuator arm connected to the shaft of the actuator; an first arm connected to a vane of the first set of vanes, wherein the first arm is operably connected to the actuator arm; and a second arm connected to a vane of the second set of vanes, wherein the second arm is operably connected to the actuator arm; a pin connected to said actuator arm; a slot positioned in said first arm, wherein the pin moves in the slot and rotates the first arm as the actuator arm and shaft rotate from the first position to the second position; the second arm is idle as the pin moves in the slot and rotates the first arm; a first gear connected to the actuator arm; a second gear connected to the second arm, wherein the first gear rotates the second gear and the first arm as the actuator arm and shaft rotate from the second position to the third position; the first arm is idle as the first gear rotates the second gear and the second arm; the shaft of the actuator rotates 90 degrees about an axis of the shaft as the shaft rotates from the first position to the second position, and the shaft of the actuator rotates 90 degrees about the axis of the shaft as the shaft rotates from the second position to the third position.

Embodiments further include an air curtain system, comprising: a control unit programmed to control an airflow along an interior surface of a vehicle; a light sensor in operable communication with the control unit, the light sensor determining a position of a light source; an air curtain system in operable communication with the control unit, the air curtain system having a housing that directs the airflow out of a first opening and a second opening, and the air curtain system having a first set of vanes positioned over the first opening and a second set of vanes positioned over the second opening, wherein the first set of vanes moves between an open position to allow the airflow to exit the first opening and a closed position to obstruct the airflow from exiting the first opening, and wherein the second set of vanes moves between an open position to allow the airflow to exit the second opening and a closed position to obstruct the airflow from exiting the second opening; instructions that, when executed by the control unit, cause the control unit to: receive the position of the light source from the light sensor; determine that the position of the light source is within a range of predetermined positions; cause the air curtain system to move the first and second sets of vanes from the respective closed positions to the respective opening positions so that the airflow is directed to the interior surface of the vehicle.

Aspects of the above air curtain system can include: the instructions that, when executed by the control unit, cause the control unit to: receive an input from an occupant of the vehicle; cause the air curtain system to move the first set of vanes from the open position to the closed position and a flap to extend proximate to the second set of vanes, wherein the flap redirects the airflow away from the interior surface of the vehicle; an actuator of the air curtain system having a shaft that rotates between a first position, a second position, and a third position; an arm connected to the shaft of the actuator and operably connected to the first and second sets of vanes, wherein the first and second sets of vanes are open in the first position, the first set of vanes is closed and the second set of vanes is open in the second position, and the first and second sets of vanes are closed in the third position; an area of the first opening is equal to or greater than an area of the second opening, and wherein the first opening and the second opening combine to form a continuous opening having a height and a width with an aspect ratio of at least 1:5; a second air curtain system in operable communication with the control unit, wherein the second air curtain is closed when the instructions cause the air curtain system to move the first and second sets of vanes from the respective closed positions to the respective opening positions so that the airflow is directed to the interior surface of the vehicle.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The following definitions are used in this disclosure.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "automatic" and variations thereof refer to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory (RAM), read only memory (ROM), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The terms "determine", "calculate" and "compute," and variations thereof, are used interchangeably and include any type of methodology, process, mathematical operation or technique.

"Means" shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element.

What is claimed is:

1. A vehicle, comprising:
   a window;
   a housing positioned above the window that directs an airflow out of a first opening and a second opening;
   a first cover positioned over the first opening, the first cover configured to move between an open position to allow the airflow to exit the first opening and a closed position to obstruct the airflow from exiting the first opening; and
   a second cover positioned over the second opening, the second cover configured to move between an open position to allow the airflow to exit the second opening and a closed position to obstruct the airflow from exiting the second opening;
   wherein, when the first and second covers are in the open positions, the airflow is directed to a surface of the window such that a pressure between the airflow and the surface of the window is less than an ambient pressure and the airflow adheres to the surface of the window, and
   when one of the first and second covers are in the closed position, the airflow is directed away from the window.

2. The vehicle of claim 1, further comprising:
   a flap positioned proximate to the second cover, and the flap moves between a retracted position where the flap allows the airflow to reach the surface of the window and an extended position where the flap redirects the air flow away from the surface of the window.

3. The vehicle of claim 1, wherein when the first and second covers are in the open positions, the airflow is further directed to a surface of a door.

4. The vehicle of claim 3, wherein the airflow is directed in a downward direction to the surface of the door and the surface of the window.

5. The vehicle of claim 1, wherein the first opening and the second opening combine to form a continuous opening having a height and a width with an aspect ratio of at least 1:5.

6. The vehicle of claim 1, wherein the airflow is directed to the surface of the window in a direction that forms an angle with a portion of the surface of the window, wherein the angle is between approximately 0 and 30 degrees.

7. The vehicle of claim 1, further comprising:
   a conduit that directs the airflow from the first and second openings to the surface of the window, wherein the conduit curves from a first end at the first and second openings to a second end.

* * * * *

UNITED STATES PATENT AND TRADEMARK OFFICE
CERTIFICATE OF CORRECTION

PATENT NO. : 11,618,300 B2
APPLICATION NO. : 16/420589
DATED : April 4, 2023
INVENTOR(S) : Adam T. Woodward It is certified that error appears in the above-identified patent and that said Letters Patent is hereby corrected as shown below:

On the Title Page

Item (71) "Applicant", Column 1, Line 5, please delete "Anhui" and insert -- Hefei --, therefore.

Item (73) "Assignee", Column 1, Line 11, please delete "Heifei" and insert -- Hefei --, therefore.

Signed and Sealed this
Thirteenth Day of June, 2023

*Katherine Kelly Vidal*

Katherine Kelly Vidal
*Director of the United States Patent and Trademark Office*